United States Patent [19]

Marquer

[11] Patent Number: 4,561,346
[45] Date of Patent: Dec. 31, 1985

[54] DEVICE FOR VIBRATING A DEEP FRYING PAN

[76] Inventor: Andre Marquer, 1721 Fisher Dr., Apt. 109, Oxnard, Calif. 93003

[21] Appl. No.: 635,053

[22] Filed: Jul. 27, 1984

[51] Int. Cl.$^4$ .............................................. A47J 37/04
[52] U.S. Cl. ......................................... 99/348; 74/86;
99/409; 99/423; 219/433; 366/208
[58] Field of Search ................. 99/409, 348, 423, 403,
99/443 R; 219/433; 366/208, 219, 146; 74/86

[56] References Cited

U.S. PATENT DOCUMENTS

| | | | |
|---|---|---|---|
| 2,829,528 | 4/1958 | Hulick | 366/208 X |
| 3,607,478 | 9/1971 | Hennings | 366/208 X |
| 3,635,150 | 1/1972 | Piedallu | 99/348 X |
| 3,688,684 | 9/1972 | Piedallu | 99/409 |
| 4,055,677 | 10/1977 | White | 99/409 X |
| 4,061,315 | 12/1977 | Eitzen | 366/208 X |

FOREIGN PATENT DOCUMENTS 1309759   3/1973   United Kingdom ................ 366/208

*Primary Examiner*—Billy J. Wilhite
*Attorney, Agent, or Firm*—Milton S. Gerstein

[57] ABSTRACT

A device is disclosed for oscillating and vibrating a deep pan so that the contents in the pan are thoroughly and evenly cooked without the chef's continual attention. The device is moved back-and-forth via a lever arm connected to a rotating disc. The lever arm is connected to the disc by a lost-motion connection, in the first embodiment of the invention. In the second embodiment, the plate supporting the frying pan is moved back-and-forth via a crank arm pivotally connected to the disc, while the other end of the crank arm is pivotally connected to a connecting link, which is attached to the underside of the support plate. Rollers mount the support plate for movement, and may allow for compound movement of the support plate when casters are used. The compound motion is generated by mounting the rotating disc in a plane offset from the horizontal and allowing sufficient play to the rollers mounting the support plate.

8 Claims, 5 Drawing Figures

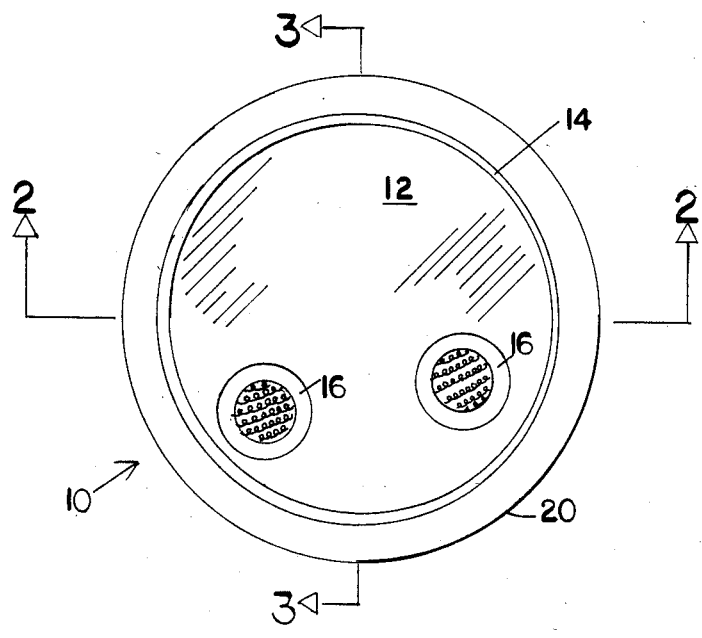
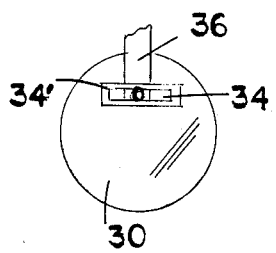
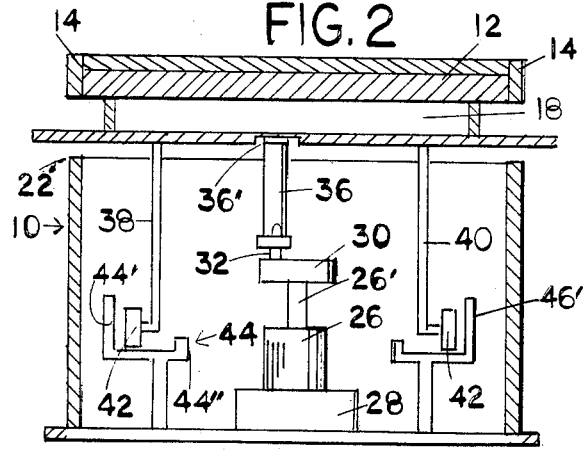
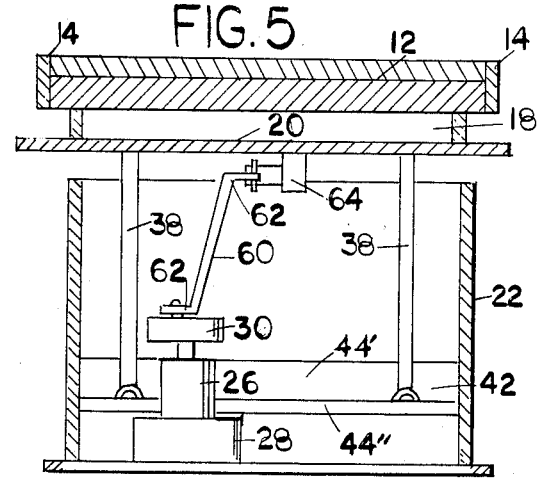
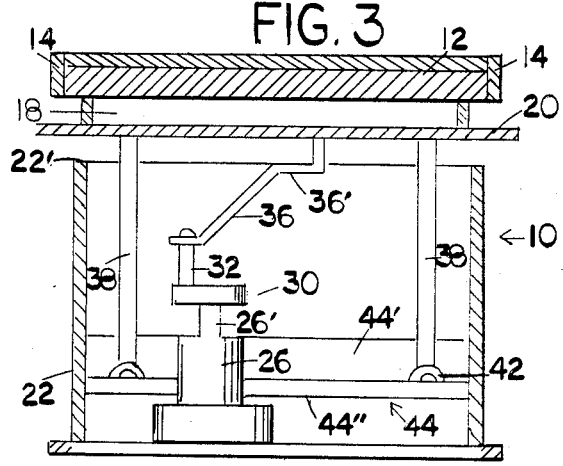

4,561,346

DEVICE FOR VIBRATING A DEEP FRYING PAN

BACKGROUND OF THE INVENTION

The present invention is directed to a device for oscillating and vibrating a deep frying pan so that the food items in the frying pan are evenly and thoroughly cooked, without the need of continual attention by the chef. It is time-consuming and tedious for a chef preparing a dish of food in a deepfrying pan to have to continually shake and oscillate the frying pan by hand in order to ensure that the contents in the frying pan are properly and thoroughly cooked. The present invention provides a device by which the vibrating of the frying pan is accomplished by mechanical means, whereby the chef is freed from the manual task currently required of him.

Applicant is well-aware of the following patents: U.S. Pat. No. 3,635,150—M. Piedallu—Jan. 18, 1972; U.S. Pat. No. 3,688,684—M. Piedallu—Sept. 5, 1972.

SUMMARY OF THE INVENTION

It is, therefore, the primary object of the present invention to provide a device for mechanically oscillating and vibrating a deep frying pan, so that the contents in the pan are evenly and properly cooked.

The device of the present invention provides, in a first embodiment, for the supporting of the deep frying pan upon a support plate that is oscillated back and forth in at least one direction via a lever arm that is translated back-and-forth via a lost-motion connection with an eccentric pin of a rotating disc. In the second embodiment of the invention, the connection between the rotating disc and the support plate is achieved via a rotating crank arm pivotally connected at one end to the disc, and at the other end pivotally connected to an end of a connecting rod. The other end of the connecting rod is attached to the underside of the support plate. In each embodiment, the disc and motion-generating mechanism connected between the disc and the support plate are mounted in a main frame below the support plate.

The support plate is mounted for movement upon rollers, which allow for the option of providing compound motion to the support plate, so as to move the frying pan in a plurality of directions, not just one longitudinal direction. By providing casters for the rollers, a support plate may be moved in the compound motion. Such compound motion is a combination of motion along three mutually-perpendicular axes. One of three axes is taken in a direction normal to the plane of the support plate, so that up-and-down motion may be provided to the frying pan. This is accomplished by mounting the rotating disc at a slight acute angle relative to a horizontal plane.

BRIEF DESCRIPTION OF THE DRAWING

The invention will be more readily understood with reference to the accompanying drawing, wherein FIG. 1 is a plan view of the oscillating deep-fryer apparatus of the present invention;

FIG. 2 is a cross-sectional view taken along line 2—2 of FIG. 1;

FIG. 3 is a cross-sectional view taken along line 3—3 of FIG. 1;

FIG. 4 is a partial plan view showing the connection betwe the mounting support plate and the driven disc of the present invention; and FIG. 5 is a cross-sectional view of another embodiment of the present invention where the support plate is oscillated via a crank arm and connecting rod;

DETAILED DESCRIPTION OF THE INVENTION

Referring now to the drawing in greater detail, the deep fryer oscillating apparatqs of the present invention is indicated generally by reference 10. The apparatus 10 has a top support plate 12 for supporting thereon a deep frying pan, in order to vibrate and shake the frying pan to ensure that the contents therein are properly and evenly cooked. The support plate 12 is preferably of circular shape, and has a circular upstanding rim 14 extending about the periphery to define the limits of movement of the frying pan supported on the plate 12. As shown in FIG. 1, the support plate 12 is provided with a plurality of heating units or elements 16, which, at their upper-most extension, lie flush with the upper surface of the support plate 12. The heating elements 16 are used to heat the frying pan there in order to heat the oil in the pan, so as to cook the food contained therein.

Though not shown, the heating elements 16 are connected to a conventional electric wall outlet, or the like, via a cord extending through suitable openings of the apparatus.

The support plate 12 is fixedly attached to a cylindrical spacing element 18 of slightly smaller circular extension, which, in turn, is fixedly mounted to a mounting plate 20, which mounting plate 20 is directly connected to the mechanism for vibrating the frying pan on the support plate 12. The mounting plate 20, typically made of metal, is of larger diametric extension that the support plate 12, and is spaced above the upper circumferential lip 22' of the main frame 22 of the apparatus. The main frame is preferably also of circular cross-section, and is generally of the order of approximately a few times higher, from its base to its circumferential lip 22', than the upper unit of the apparatus including the support plate 12, the cylindrical element 18, and the mounting plate 20. Mounted within the hollow interior of the main frame 22 is the mechanism for oscillating the support plate 12. This mechanism includes a low r.p.m. motor 26 mounted to the base of the main frame via a block 28. The output shaft 26' of the motor is directly coupled to a disc 30 having an eccentrically-mounted pin 32 projecting from its upper surface, in the first embodiment of the invention. The pin 32 is received for sliding movement in a slot 34 (see FIG. 4) of a lever arm 36 used for transforming the rotary motion of the disc to translational motion of the plate 20 and support plate 12. The lever arm 36 has a first substantially-horizontal end 34' in which is formed the slot 34, while the other end 36' is also substantially horizontal in the first embodiment of the invention, which end 36' is connected to the underside of the mounting plate 20. Thus, as it is clear, when the disc 30 rotates via motor 26, the lost-motion connection between the eccentrically mounted pin 32 and the slot 34 will cause the mounting plate 20 and support plate 12 to oscillate back and forth, thus shaking the frying pan supported on the support plate 12, to thus shake the contents of the frying pan, to cook them evenly and thoroughly, without the need of continual attention by the chef.

The mounting plate 20 has a pair of two downwardly-extending bracket members 38 and 40 projecting on either side of the disc 30, as shown in FIG. 2. There are two bracket members 38 and two bracket members 40, the end of each supporting a roller 42. The rollers of the bracket members 38 ride in channel 44, while those of bracket members 40 ride in channel 46. The channels 44 and 46 have upstanding side walls 44' and 46' that are high, and an inner, lower upstanding side walls 44" and 46", respectively. The side walls 44' and 44", and the side walls 46' and 46", are preferably such that the distance between each side wall of a channel is greater than the diametric extension of a roller 42. Each roller 42 is rotatably supported by an axle connected to the lower end of a respective bracket member 38 and 40. It is within the scope and purview of the present invention to make the width of the channels such that they can only accomodate back-and-forth longitudinal motion of the support plate 12. In this, the side walls of each channel will be spaced a distance apart only enough to ensure that the rollers therein will be restricted to only longitudinal movement therealong, with no other motion allowed. In either instance, the channel side walls effectively act as guide supports for the movement of lever arm 36, whether such movement be restricted to only back-and-forth movement, or movement having a combination of back-and-forth movement and movement relative to the back-and-forth longitudinal movement.

In the case where the channels are of narrow width to permit only longitudinal back-and-forth motion of the rollers, the support plate and frying pan thereon will have that kind of motion only. However, in the case where the channels are wider to allow for revolution of the rollers such that the revolution of the axle is in a plane parallel to the longitudinal axis of the axle itself, then, by providing casters which are allowed to revolve as well as as rotate, the support plate 12 and frying pan thereon can take on compound motion in more than one direction, since the movement of the lever arm 36 is only restricted by the side walls of the channels, which in this case are spaced wide enough apart to permit compound motion. It is noted that this compound motion is delivered to the support plate 12 via the lever arm 36, since the connection between the pin 32 and slot 34 is such that, owing to the eccentricity of the pin, some forces are unavoidably applied by the pin 32 in a direction that tends to rotate the lever arm about its pivoted end 36', since the application of the force by the pin changes for all angular locations thereof, thus providing forces that are not in the back-and-forth mode, as viewed in FIG. 3. Also, to aid in the compound motion of the support plate 12 and lever arm 36, the slot 34 may be made of shorter length, so as to ensure that the pin 32 will during certain intervals of its periodicity contact the ends of the slots to provide strong rotational forces to the lever arm to cause it to pivot about its pivot end 36'. Again, the compound motion is inherent in the arrangement shown in FIGS. 2 and 3, while the channels provide the motion-directing restraints. It is, in fact, within the scope and spirit of the present invention to allow for adjustment of the side walls of each channel so as to alter their spacing and thus control the compound movement of the rollers, or limit them to only longitudinal movement, as described. Such adjustability may be readily accomplished by well-known techniques, such as a C-clamp type connection between the side walls of a respective channel.

In another embodiment of the invention shown in FIG. 5, the eccentric pin 32 and slot 34 have been replaced by pivotally connecting the end of a lever to the disc 30. In this embodiment, the crank 60 has an upper horizontal end 62 pivotally connected to a connecting rod 64 which is mounted to the underside of the mounting plate 20. The other, lower horizontal end 62' of the crank 60 is pivotally connected to the upper face of the disc 30. As in the first embodiment above-described, the rollers 42 control the movement of the support plate 12, so that by making the width of the channels 44 and 46 wider or narrower, compound motion or simple harmonic motion may be achieved for the support plate.

It is also within the scope and purview of the present invention to aid in the compound motion of the plate 12, and also to provide for up-and-down movement to the support plate To aid in the compound movement of the support plate, the disc 30 may be mounted at an angle relative to a horizontal plane. Inclining the disc, as viewed in FIG. 3, in a direction parallel to the channel 44, will cause simple up-and-down vertical movement to the support plate 12 for a certain interval. The angle of inclination of the disc 30 need be only very slight. To aid in the compound motion of the support plate and to combine the compound motion with an up-and-down motion, the disc 30 may be mounted at an angle relative to the horizontal such that, viewing FIG. 2, the disc is inclined along a direction parallel to a perpendicular between the channels 44 and 46. This will cause both up-and-down motion as well as sideways movement.

While specific embodiments of the invention have been shown and described, it is to be understood that numerous changes and modifications thereof may be made without departing from the scope and spirit of the invention.

What is claimed is:

1. A device for vibrating a frying pan in order to evenly and thoroughly cook the contents thereof comprising:

a main frame;

first bracket runner means mounted by said main frame on one side thereof;

second bracket runner means mounted by said main frame on the other side thereof;

a frying pan support plate means for supporting thereon a frying pan in which food is cooked, said frying pan support plate means freely supporting a frying pan thereon for free uninhibited movement thereon within certain boundaries, said support plate means comprising a circumferential outer lip extending upwardly and away from said main frame, said outer lip limiting the extreme movement of a frying pan on said support plate means in all directions to provide limits to the movement of the frying pan;

heating means formed in said support plate means for movement therewith, said support plate means having at least one opening formed therethrough for mounting said at least one heating means so that said heating means moves with all movements of said support plate means;

roller means connected to the underside of said support plate means for mounting said roller means in a direction toward said first and second bracket runner means, in a direction away from the direction in which said outer lip projects; said roller means comprising a first roller element mounted to the underside of said support plate means for operative engagement in said first bracket runner means for movement along the length therealong, and a second roller element spaced from said first roller element the same distance said second bracket runner means is spaced from said first bracket runner means and in the same direction thereof for operative engagement in said second bracket runner means for movement along the length thereof; said roller means having means for connecting each of said first roller element and said second roller element to the underside of said support plate means so that movement of said roller elements along said bracket runner means will cause corresponding movement of said support plate means along the lengths of said bracket runner means;

said main frame having at least one upper opening through which extend said roller means for connection to the underside of said support plate means thereby for movement along said bracket runner means; said at least one opening of said main frame providing sufficient clearance to said support plate means to allow movement thereof by said roller means; and drive means operatively connected to an underside of said support plate means and mounted in the interior of said main frame directly below said support plate means, said drive means comprising a motor having a drive shaft, a rotatable disc operatively connected to the drive shaft of said motor for rotating said disc, and lever means having a first end connected to said underside, and a second end below said first end connected to said disc; said disc comprising means for mounting said second end of said lever arm thereto, whereby said mounting plate is caused to have oscillatory movement along said bracket means.

2. The device according to claim 1, wherein said means mounting said second end of said lever means comprises an eccentric pin mounting said second end eccentrically to a portion of said disc, said portion of said disc lying offset from the center of rotation of said disc supported by said drive shaft of said motor.

3. The device according to claim 2, wherein said lever means comprises a first lever arm having a first end constituting said first end of said lever means connected to said underside of said support plate means, said lever means further comprising a second lever arm having a second end constituting said second end of said lever means connected to said disc, said first lever arm having a second end, and said second lever arm having a first end, said first end of said second lever arm and said second end of said first lever arm being pivotally connected to each other; said lever means further having means for pivotally connecting said first end of said second lever arm to said second end of said first lever arm; said second lever arm constituting a crank driven by said disc for longitudinally moving said support plate means via said first lever arm.

4. The device according to claim 3, wherein said support plate means further comprises a mounting plate for mounting said first end of said first lever arm to said underside of said support plate means.

5. The device according to claim 2, wherein said lever means comprises an elongated slot formed in said second end, said slot having a first end and a second end, said first end being spaced from said second end in direction perpendicular to the oscillating movement of said roller means along said bracket runner means; said eccentric pin projecting from the face of said disc facing toward said slot of said second end of said lever means, said eccentric pin being received in said elongated slot for movement therein to oscillate said support plate means thereby.

6. The device according to claim 5, wherein said lever means comprises a connecting rod having a first end constituting said first end of said lever means connected to said underside of said support plate means, and a second end constituting said second end of said lever means connected to said disc, said second end of said connecting rod lying at a lower elevation relative to said first end of said connecting rod.

7. The device according to claim 1, wherein said disc rotates in a plane parallel to the plane containing said underside of said support plate means.

8. The device according to claim 1, wherein each of said first and second roller elements are mounted for 360 degree revolution about an axis perpendicular to the plane containing therein said underside of said support plate means; each of said first and said second bracket runner means having a width for supporting a respective one of said first and second roller elements for the 360 degree revolution thereon, each of said first and second bracket runner means having a first side wall adjacent a side wall of said main frame, and a second side wall spaced from said first side wall toward the other side wall of said main frame, said first side wall being spaced from said second side wall a distance greater than the diameter of a respective one of said first and second roller elements.

* * * * *